United States Patent
Nash et al.

(10) Patent No.: US 8,572,013 B1
(45) Date of Patent: Oct. 29, 2013

(54) CLASSIFICATION OF ITEMS WITH MANUAL CONFIRMATION

(75) Inventors: Todd A. Nash, Seattle, WA (US); Venkatram Pramod, Auburn, WA (US); Reginald D. McDaniel, Seattle, WA (US); Jeffrey S. Pitts, Bainbridge Island, WA (US); Charles M. Griffith, Bainbridge Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 710 days.

(21) Appl. No.: 12/749,768

(22) Filed: Mar. 30, 2010

(51) Int. Cl.
*G06E 1/00* (2006.01)
*G06E 3/00* (2006.01)
*G06F 15/18* (2006.01)
*G06G 7/00* (2006.01)

(52) U.S. Cl.
USPC .......................................................... 706/20

(58) Field of Classification Search
None
See application file for complete search history.

(56) References Cited

U.S. PATENT DOCUMENTS

| | | | |
|---|---|---|---|
| 7,043,492 B1* | 5/2006 | Neal et al. | 1/1 |
| 2004/0156540 A1* | 8/2004 | Gao et al. | 382/145 |
| 2006/0143175 A1* | 6/2006 | Ukrainczyk et al. | 707/6 |
| 2006/0293886 A1* | 12/2006 | Odell et al. | 704/231 |
| 2012/0197627 A1* | 8/2012 | Shi et al. | 704/2 |

* cited by examiner

*Primary Examiner* — Li-Wu Chang
(74) *Attorney, Agent, or Firm* — Thomas | Horstemeyer, LLP

(57) ABSTRACT

Disclosed are various embodiments for the identification and assignment of classifications for items. One of a plurality of classifications are identified in at least one computing device based at least in part on a plurality of tokens associated with the item and a data dictionary. An identified classification is thereby produced, and the identified classification is associated with a confidence score. The identified classification is automatically assigned to the item when the confidence score meets a threshold. A manual confirmation of the identified classification is obtained when the confidence score is below the threshold. The manual confirmation indicates whether the identified classification is erroneous.

20 Claims, 4 Drawing Sheets

CLASSIFICATION OF ITEMS WITH MANUAL CONFIRMATION

BACKGROUND

Products offered for sale by an online retailer may be assigned one or more classifications. As a non-limiting example, a product may be classified as a hazardous product, which may affect the handling, storage, and/or shipping of the product. Hazardous products may, for example, be subjected to additional packaging and/or labeling, handling surcharges, or other requirements. Some hazardous products may not shippable at all through certain shipping carriers.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to assigning classifications to items. As used herein, the term "item" may refer to any product, service, digital download, or any other item that may be offered for purchase, rental, download, lease, or other form of consumption. New or updated items may be uploaded to an item catalog at a rate that makes manual assignment of classifications unworkable. Various embodiments of the present disclosure use limited manual review in conjunction with a trained classifier to assign classifications to items. With the limited manual review, the trained classifier becomes more confident in its classifications, thereby reducing the need for the manual review. In the following discussion, a general description of the system and its components is provided, followed by a discussion of the operation of the same.

Figure 1:
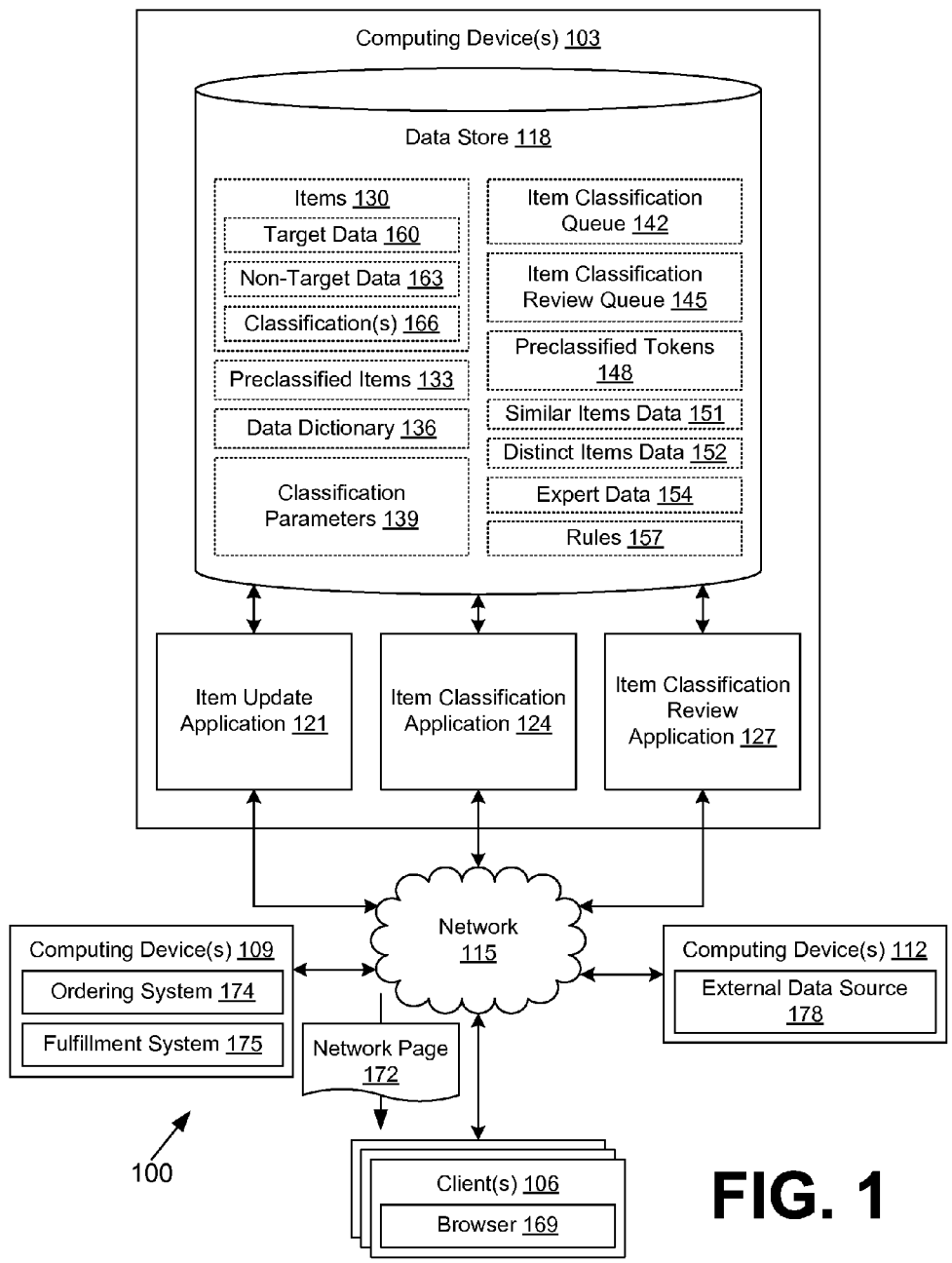
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more clients 106, one or more computing devices 109, and one or more computing devices 112 by way of a network 115. The network 115 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise, for example, a cloud computing resource, a grid computing resource, and/or any other distributed computing arrangement. Such computing devices 103 may be located in a single installation or may be dispersed among many different geographical locations. In one embodiment, the computing device 103 represents a virtualized computer system executing on one or more physical computing systems. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 118 that is accessible to the computing device 103. The data store 118 may be representative of a plurality of data stores as can be appreciated. The data stored in the data store 118, for example, is associated with the operation of the various applications and/or functional entities described below.

The components executed on the computing device 103, for example, include an item update application 121, an item classification application 124, an item classification review application 127, and other applications, services, processes, systems, engines, or functionality not discussed in detail herein. The item update application 121 is executed to receive and process new items 130 and updates to existing items 130 from clients 106 or other computing devices. The items 130 may be included within a catalog of an online merchant. In one embodiment, at least some of the items 130 may be uploaded by third-party merchants to be offered in an online marketplace. Some of those items 130 may be stocked and fulfilled from one or more materials handling facilities operated by the proprietor of the online marketplace.

The item classification application 124 is executed to identify and assign classifications to the items 130. The item classification application 124 undergoes an initial training process and is subsequently retrained by way of limited manual review. The subsequent retraining allows for a replacement of manual review with automatic assignment of classifications. The item classification review application 127 is executed to facilitate manual review of identified classifications for the items 130 that are associated with confidence scores not meeting a threshold.

The data stored in the data store 118 includes, for example, the items 130, a plurality of preclassified items 133, a data dictionary 136, one or more classification parameters 139, an item classification queue 142, an item classification review queue 145, preclassified tokens 148, similar items data 151, expert data 154, rules 157, and potentially other data. Each of the items 130 may include target data 160 and non-target data 163. The target data 160 includes data that may be used in identifying one or more classifications 166 for the respective item 130. By contrast, the non-target data 163 includes data that may be ignored in determining the classifications 166. The target data 160 and non-target data 163 in various configurations may comprise any type of data regarding an item 130 including, for example, title, description, customer reviews, metadata, features, important information, and/or other data. Non-limiting examples of classifications 166 may include hazardous items 130, unsafe items 130, firearms, banned materials, adult materials, and so on.

The preclassified items 133 may correspond to items 130 which have already been assigned one or more correct classifications 166. In one embodiment, the classifications 166 of the preclassified items 133 are manually assigned. The data dictionary 136 indicates probabilities that a token is associated with each classification 166. A token may comprise, for example, a word, a phrase, a combination of words, and/or any other string. In one embodiment, one data dictionary 136 may be maintained for all of the target data 160. In another embodiment, a separate data dictionary 136 is maintained for each type of target data 160 associated with an item 130, for example, a data dictionary 136 for titles, a data dictionary 136 for descriptions, etc. In another embodiment, a separate data dictionary 136 is maintained for each natural language associated with items 130.

The classification parameters 139 may be provided to configure various aspects of classification. As a non-limiting example, the classification parameters 139 may indicate thresholds for confidence scores at which an identified classification is assigned to an item 130. Furthermore, the classification parameters 139 may determine how the thresholds are updated as manual review and retraining of the item classification application 124 proceeds. As another non-limiting example, the classification parameters 139 may configure a quantity of tokens derived from target data 160 to be used in determining classifications 166 for items 130.

The item classification queue 142 contains items 130 that are presented by the item update application 121 for classification or reclassification by the item classification application 124. The item classification review queue 145 contains items 130 having identified classifications 166 that are presented for manual review, for example, by auditors through the item classification review application 127. The preclassified tokens 148 comprise tokens that are preclassified according to the classifications 166. The preclassified tokens 148 may be used, for example, to guide assignment of classifications 166 when items 130 contain tokens from the preclassified tokens 148. In one embodiment, the preclassified tokens 148 may comprise a white list of tokens and/or a black list of tokens used to force a classification 166 for an item 130 upon occurrence of one of the preclassified tokens 148 in the target data 160. In other embodiments, the preclassified tokens 148 may be used to weight one or more of the classifications 166 and/or to increase or decrease confidence scores associated with classifications 166.

The similar items data 151 may comprise data describing items 130 that are similar to other items 130. Such similarities may be manually determined or automatically determined. In such a case, a classification 166 associated with a similar item 130 may be more likely to be associated with an item 130. As a non-limiting example, similar items 130 to a first item 130 may be those items 130 that are viewed, purchased, or otherwise selected by users of a network site in association with the first item 130. The distinct items data 152 may comprise data describing items 130 that are most distinct from other items 130. In such a case, a classification 166 associated with a distinct item 130 may be less likely to be associated with an item 130. The similar items data 151 and distinct items data 152 may also be used to weight one or more of the classifications 166 and/or to increase or decrease confidence scores associated with classifications 166.

The expert data 154 may comprise data that may be used to assist in identifying classifications 166 according to lookups of other data. As a non-limiting example, expert data 154 may comprise flash points of various chemical compounds, such that an item 130 may be classified as hazardous when it contains a chemical compound having a flashpoint below a predefined threshold. The expert data 154 may also be used to weight one or more of the classifications 166 and/or to increase or decrease confidence scores associated with classifications 166. Rules 157 may define conditions when an item 130 may be shipped when the item 130 is assigned one or more of the classifications 166.

The client 106 is representative of a plurality of client devices that may be coupled to the network 115. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, or other devices with like capability.

The client 106 may be configured to execute various applications such as a browser 169 and/or other applications. The browser 169 may be executed in a client 106, for example, to access and render network pages 172, such as web pages, or other network content served up by the computing device 103 and/or other servers. The client 106 may be configured to execute applications beyond browser 169 such as, for example, email applications, instant message applications, and/or other applications.

Each of the computing devices 109, 112 may comprise, for example, a server computer or any other system providing computing capability. Alternatively, a plurality of computing devices 109, 112 may be employed that are arranged, for example, in one or more server banks or computer banks or other arrangements. For example, a plurality of computing devices 109, 112 together may comprise, for example, a cloud computing resource, a grid computing resource, and/or any other distributed computing arrangement. Such computing devices 109, 112 may be located in a single installation or may be dispersed among many different geographical locations. In one embodiment, the computing devices 109, 112 represent a virtualized computer system executing on one or more physical computing systems. It is understood that a computing device 109 or 112 or a plurality of computing devices 109 or 112 may be employed in the various arrangements as described above.

Various applications and/or other functionality may be executed in the computing device 109 according to various embodiments. The components executed on the computing device 109, for example, include an ordering system 174, a fulfillment system 175 and other applications, services, processes, systems, engines, or functionality not discussed in detail herein. The ordering system 174 is executed to facilitate the placing of orders for items 130. To this end, the ordering system 174 may generate network pages 172 offering the items 130 for sale, rental, lease, download, etc. The fulfillment system 175 is executed to facilitate the fulfillment of orders for items 130 through one or more materials handling facilities. To this end, the fulfillment system 175 may direct the picking of items 130, the packing of the items 130, the shipping of the items 130, and/or other fulfillment activities.

Various applications and/or other functionality may be executed in the computing device 112 according to various embodiments. The components executed on the computing device 112, for example, include an external data source 178 and other applications, services, processes, systems, engines, or functionality not discussed in detail herein. The external data source 178 provides data to the computing device 103 such as expert data 154 and other data. In one configuration, the computing device 112 may be operated by a third party.

Next, a general description of the operation of the various components of the networked environment 100 is provided. To begin, the item classification application 124 begins a training process to build the data dictionary 136. A multitude of preclassified items 133 are provided to the item classification application 124. For each of the preclassified items 133, the item classification application 124 examines the target data 160 and generates tokens from the target data 160. Such tokens may correspond to words, combination of words, text strings, etc. A count is produced in the data dictionary 136 for each of the tokens for each of the classifications 166. The tokens generated from a preclassified item 133 associated with a given classification 166 may thereby increment the corresponding counts associated with the given classification 166 and the tokens.

In this way, probabilities may be obtained for a given token to be associated with one classification 166 or another classification 166. As a non-limiting example, in the case of a hazardous product classification 166 and a non-hazardous product classification 166, the word "flammable" may have a high probability of being hazardous due to having a far greater count associated with the hazardous product classification 166 compared to a count associated with the non-hazardous product classification 166. As another non-limiting example, the word "computer" may have a high probability of being non-hazardous due to having a far greater count associated with the non-hazardous product classification 166 compared to a count associated with the hazardous product classification 166. As yet another non-limiting example, the word "the" may have a low probability of being hazardous or non-hazardous due to having a roughly equal count associated with the hazardous product classification 166 compared to a count associated with the non-hazardous product classification 166.

Once the data dictionary 136 has been generated, items 130 may be classified by the item classification application 124 as needed. The item update application 121 may facilitate the updating of a catalog of items 130. Further, the item update application 121 may determine when a new item 130 or an updated item 130 is to be classified or reclassified. To this end, the item update application 121 may place items 130 onto the item classification queue 142. In one embodiment, the item update application 121 may be executed periodically. The item classification application 124 may obtain items 130 from the item classification queue 142.

The item classification application 124 may identify one or more classifications 166 for an item 130 based at least in part on the respective target data 160 and the data dictionary 136. As a non-limiting example, the item classification application 124 may tokenize the target data 160 and determine a probability that each of the resulting tokens corresponds to one of the classifications 166 using entries of tokens in the data dictionary 136. In one embodiment, the item classification application 124 may use a subset of the tokens that are associated with the strongest probabilities. As a non-limiting example, fifteen tokens associated with the top fifteen probabilities may be used. The probabilities for a classification 166 may then be multiplied together to produce a confidence score for that classification 166 using a naïve Bayes approach. A classification 166 may be identified for the item 130 according to the classification 166 having the greatest confidence score.

The confidence score of the identified classification 166 may be compared to a threshold to determine whether manual review is necessary. If the confidence score meets or exceeds the threshold for automatic classification, the classification 166 is automatically assigned to the item 130. By contrast, if the confidence score does not meet the threshold, the item classification application 124 may place the item 130 onto the item classification review queue 145.

The item classification review application 127 obtains an item 130 from the item classification review queue 145 and presents the item 130 to an auditor user at a client 106 for manual confirmation of the identified classification 166. The identified classification 166 may be confirmed as correct and thereby assigned to the item 130. However, if the identified classification 166 is confirmed to be not correct or erroneous, the item classification review application 127 and/or the item classification application 124 may then retrain the classifier by updating the data dictionary. The item 130 being examined may be processed to as to lower the counts of the tokens of the item 130 that are associated with the erroneous classification 166. This action makes it less likely that future presentations of similar items will be classified according to the erroneous classification 166.

Moreover, the threshold used to determine whether an identified classification 166 for an item 130 is subjected to manual review may change over time with the retraining and further configuration of the data dictionary 136. As more identified classifications 166 are deemed correct from the manual review, the confidence score threshold may be adjusted downward, thereby permitting more identified classifications 166 to be automatically assigned to items 130 without manual review.

Additionally, the classification of items 130 by the item classification application 124 may be impacted by the preclassified tokens 148, the similar items data 151, the expert data 154, and/or other data. When one of the preclassified tokens 148 appears in the target data 160, the item classification application 124 may be configured to select as the identified classification 166 for the item 130 the classification 166 associated with the preclassified tokens 148 or the classification 166 may be positively weighted. Likewise, when a similar item 130 for an item 130 is identifiable from the similar items data 151, the classification 166 of the similar item 130 may be assigned to the item 130 or the classification 166 may be positively weighted. Alternatively, when a most distinct item 130 for an item 130 is identifiable from the distinct items data 152, the classification 166 of the most distinct item 130 may not be assigned to the item 130 or the classification 166 may be negatively weighted. Furthermore, the target data 160 may undergo an analysis with respect to the expert data 151, which may identify or weight a classification 166. These techniques may be applied with varying precedence in various embodiments and may be combined to yield more accurate results.

The expert data 151 may be obtained from an external data source 178 on one or more computing devices 112 as desired. In one embodiment, the expert data 151 may be downloaded on a periodic basis. In another embodiment, the external data source 178 may be consulted during each query of the expert data 151.

The classification(s) 166 assigned to an item 130 may affect how the item 130 is processed in a materials handling facility. As a non-limiting example, when an item 130 is deemed hazardous, rules 157 may be consulted to identify one or more shipping exceptions in order for the item 130 to be shipped, if possible. A shipping exception may allow an item 130 that is deemed hazardous to be shipped through a predefined shipping carrier or to be shipped according to special shipping procedures, etc. The information regarding the shipping exceptions may be communicated to the fulfillment system 175 and/or other systems to enable the items 130 to be processed in accordance to rules 157. In one embodiment, the rules 157 may be applied to obtain a hazard class for the item when the identified classification 166 is a hazardous classification 166. As a non-limiting example, a rule 157 may depend on expert data 154 that is missing or unavailable for an item 130. In such a case, the item classification application 124 may be configured to use expert data 154 for a similar item 130 in order to evaluate the rule 157.

Figure 2:
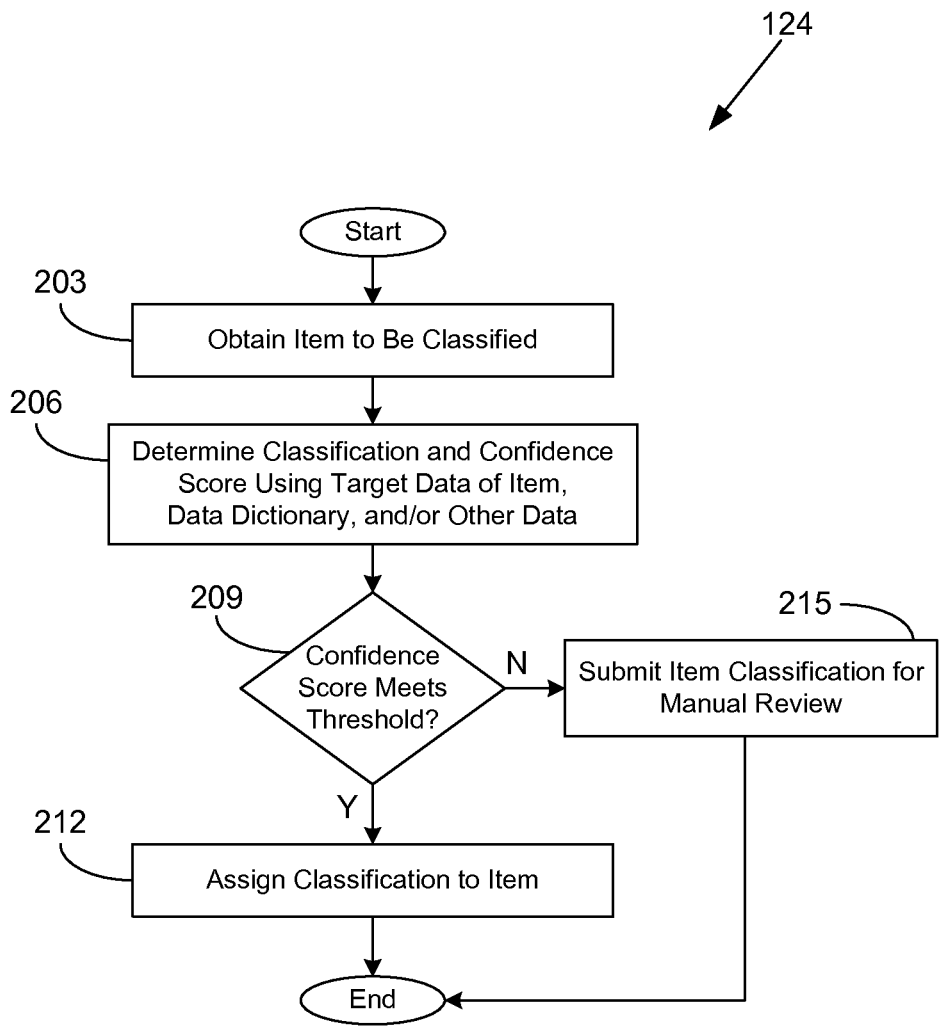
FIG. 2 is a flowchart illustrating one example of functionality implemented as portions of an item classification application executed in a computing device in the networked environment of FIG. 1 according to various embodiments of the present disclosure.

Referring next to FIG. 2, shown is a flowchart that provides one example of the operation of a portion of the item classification application 124 according to various embodiments. It is understood that the flowchart of FIG. 2 provides merely an example of the many different types of functional arrangements that may be employed to implement the operation of the portion of the item classification application 124 as described herein. As an alternative, the flowchart of FIG. 2 may be viewed as depicting an example of steps of a method implemented in the computing device 103 (FIG. 1) according to one or more embodiments.

Beginning with box 203, the item classification application 124 obtains an item 130 (FIG. 1) to be classified, for example, from the item classification queue 142 (FIG. 1). In one embodiment, the item classification queue 142 is populated by the item update application 121 in response to updates to items 130. Such updates may be submitted from the client 106 (FIG. 1), for example, through a network page 172 (FIG. 1).

In box 206, the item classification application 124 determines a classification 166 (FIG. 1) for the item 130 along with a confidence score reflecting a confidence in the determination. The classification 166 is selected from a plurality of classifications 166. The classification 166 is determined based in part on the target data 160 (FIG. 1) of the item 130, the data dictionary 136 (FIG. 1), and other data. The other data may include preclassified tokens 148 (FIG. 1), similar items data 151 (FIG. 1), expert data 154 (FIG. 1), etc.

Next, in box 209, the item classification application 124 determines whether the confidence score meets a threshold. Although the item classification application 124 is presented as using a rules-based approach to make a decision, it is understood that other machine learning techniques may be used in making the decision. Non-limiting examples of other machine learning techniques include decision trees, neural networks, and other techniques. If the confidence score meets the threshold, the item classification application 124 moves to box 212 and assigns the classification 166 to the item 130. In other words, the item classification application 124 is confident enough in the determination to automatically assign the classification 166 to the item 130. Thereafter, the item classification application 124 ends.

If, instead, in box 209, the item classification application 124 determines that the confidence score for the determination does not meet the threshold, the item classification application 124 proceeds to box 215 and submits the item classification 166 for manual review, for example, by adding the item 130 to the item classification review queue 145 (FIG. 1). Thereafter, the item classification application 124 ends. Subsequently, the classification 166 may be reviewed by auditors to determine whether it is correct. The correct classification 166 may then be manually assigned to the item 130.

Figure 3:
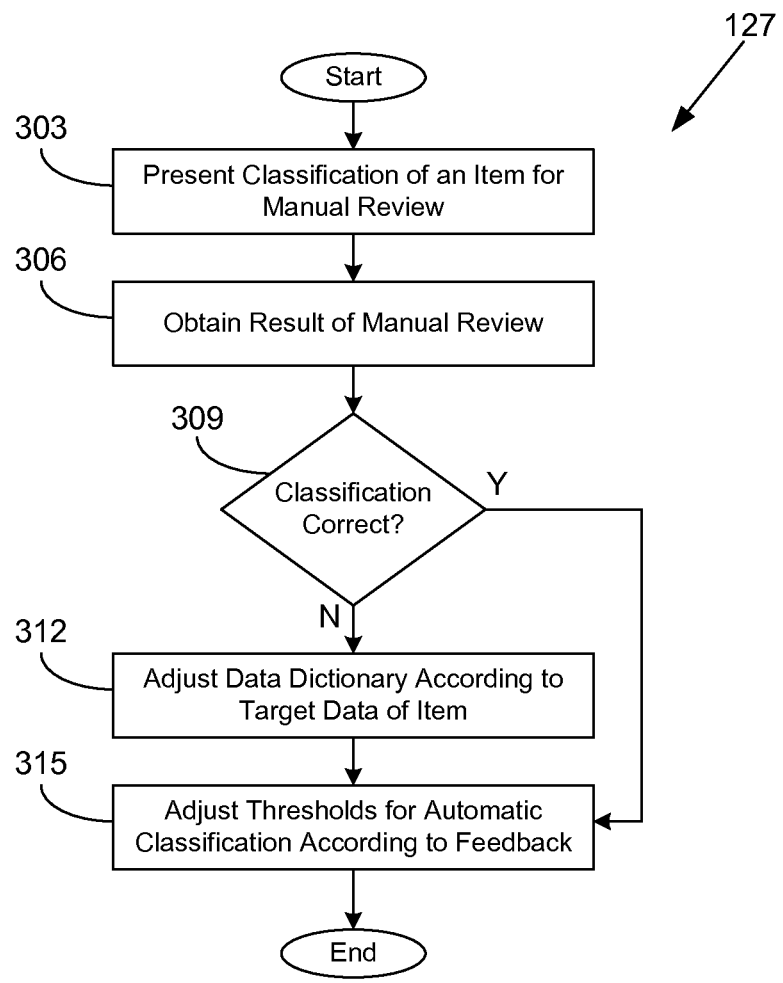
FIG. 3 is a flowchart illustrating one example of functionality implemented as portions of an item classification review application executed in a computing device in the networked environment of FIG. 1 according to various embodiments of the present disclosure.

Turning now to FIG. 3, shown is a flowchart that provides one example of the operation of a portion of the item classification review application 127 according to various embodiments. It is understood that the flowchart of FIG. 3 provides merely an example of the many different types of functional arrangements that may be employed to implement the operation of the portion of the item classification review application 127 as described herein. As an alternative, the flowchart of FIG. 3 may be viewed as depicting an example of steps of a method implemented in the computing device 103 (FIG. 1) according to one or more embodiments. In various embodiments, functionality described in connection with the item classification review application 127 may be included within the item classification application 124, the item update application 121, and/or other applications.

Beginning with box 303, the item classification review application 127 presents an identified classification 166 (FIG. 1) of an item 130 (FIG. 1) for manual review. The item 130 (FIG. 1) may be obtained, for example, from the item classification review queue 145 (FIG. 1). In one embodiment, one or more network pages 172 (FIG. 1) may be generated and sent to the browser 169 (FIG. 1) so that an auditor user may view the automatically identified classification 166 and the item 130 and manually determine whether the automatically identified classification 166 is correct.

In box 306, the item classification review application 127 obtains the result of the manual review from the client 106 (FIG. 1). The result, which may be regarded as a confirmation, may be used to improve the accuracy of the item classification application 124 (FIG. 1).

In box 309, the item classification review application 127 determines whether the confirmation indicates that the classification 166 is correct. If the classification is not correct, the item classification review application 127 proceeds to box 312 and adjusts the data dictionary 136 (FIG. 1) according to target data 160 (FIG. 1) associated with the item 130. In one embodiment, probabilities associated with tokens obtained from the target data 160 are adjusted so that it is less probable that the tokens indicate the incorrect classification 166. The item classification review application 127 moves to box 315.

If the item classification review application 127 ascertains that the classification 166 is correct in box 309, the item classification review application 127 also moves to box 315. In one embodiment, the item classification review application 127 may be configured to update the data dictionary 136 based at least in part on the target data 160 associated with the item 130. Such updates may be in response to the manual confirmation. Alternatively, the item classification application 124 may rebuild or refresh the data dictionary 136 periodically based at least in part on data associated with automatically classified items 130 having manually confirmed classifications 166.

In box 315, the item classification review application 127 may adjust the thresholds for automatic assignment of classifications 166 to items 130 in box 315 according to the feedback. In one embodiment, as erroneous identifications of classifications 166 are reduced, manual review of the classifications 166 may be reduced. Accordingly, confidence scores associated with lower probabilities may be sufficient for automatic assignment of classifications 166. Thereafter, the item classification review application 127 ends.

Figure 4:
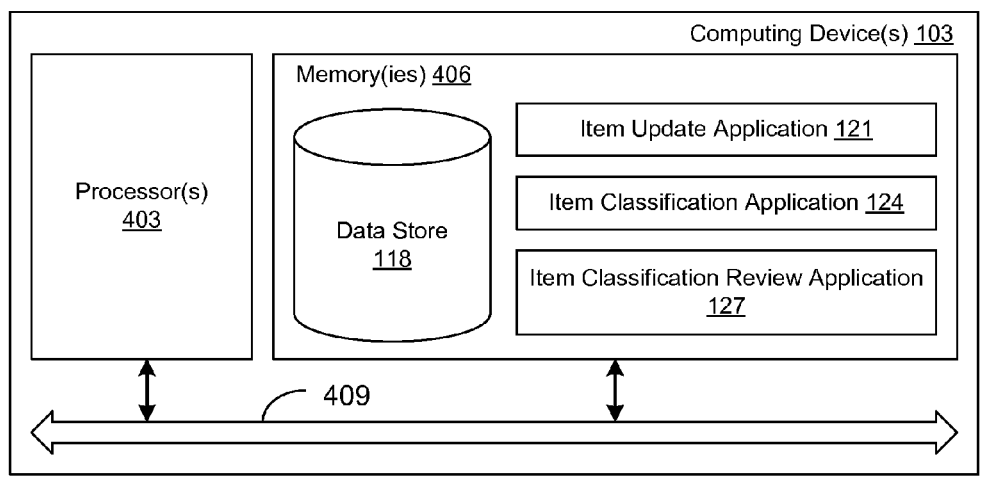
FIG. 4 is a schematic block diagram that provides one example illustration of a computing device employed in the networked environment of FIG. 1 according to various embodiments of the present disclosure.

With reference to FIG. 4, shown is a schematic block diagram of the computing device 103 according to an embodiment of the present disclosure. The computing device 103 includes at least one processor circuit, for example, having a processor 403 and a memory 406, both of which are coupled to a local interface 409. To this end, the computing device 103 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the item update application 121, the item classification application 124, the item classification review application 127, and potentially other applications. Also stored in the memory 406 may be a data store 118 and other data. In addition, an operating system may be stored in the memory 406 and executable by the processor 403.

It is understood that there may be other applications that are stored in the memory 406 and are executable by the processors 403 as can be appreciated. Where any component discussed herein is implemented in the form of software, any one of a number of programming languages may be employed such as, for example, C, C++, C#, Objective C, Java, Java Script, Perl, PHP, Visual Basic, Python, Ruby, Delphi, Flash, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network 115 (FIG. 1) that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the item update application 121, the item classification application 124, the item classification review application 127, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2 and 3 show the functionality and operation of an implementation of portions of the item classification application 124 and the item classification review application 127. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowcharts of FIGS. 2 and 3 show a specific order of execution, it is understood that the order of execution may differ from that which is depicted. For example, the order of execution of two or more blocks may be scrambled relative to the order shown. Also, two or more blocks shown in succession in FIGS. 2 and 3 may be executed concurrently or with partial concurrence. Further, in some embodiments, one or more of the blocks shown in FIGS. 2 and 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the item update application 121, the item classification application 124, and the item classification review application 127, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A non-transitory computer-readable medium embodying a program executable in at least one computing device, the program comprising:
   code that builds a data dictionary based at least in part on data describing a plurality of preclassified products, each one of the preclassified products having a manually determined hazardous classification, the data dictionary defining a corresponding probability that each one of a plurality of terms is classified as hazardous;
   code that identifies a hazardous classification for a product based at least in part on a plurality of terms associated with the product and the data dictionary, thereby producing an identified hazardous classification that is associated with a confidence score;
   code that automatically assigns the identified hazardous classification to the product when the confidence score meets a threshold;
   code that obtains a manual confirmation of the identified hazardous classification when the confidence score is below the threshold, the manual confirmation indicating whether the identified hazardous classification is correct;
   code that assigns the identified hazardous classification to the product when the manual confirmation indicates that the identified hazardous classification is correct;
   code that obtains a manually selected hazardous classification when the manual confirmation indicates that the identified hazardous classification is not correct;
   code that assigns the manually selected hazardous classification to the product and adjusts the data dictionary when the manual confirmation indicates that the identified hazardous classification is not correct; and
   code that adjusts the threshold based at least in part on whether the identified hazardous classification is correct.

2. A system, comprising:
   at least one hardware computing device; and
   an item classification application executable in the at least one hardware computing device, the item classification application comprising:
      logic that identifies one of a plurality of classifications based at least in part on data associated with an item and a data dictionary, thereby producing an identified classification that is associated with a confidence score;
      logic that automatically assigns the identified classification to the item when the confidence score meets a threshold;
      logic that obtains a manual confirmation of the identified classification when the confidence score is below the threshold, the manual confirmation indicating whether the identified classification is correct;
      logic that builds the data dictionary based at least in part on data describing a plurality of preclassified items, each one of the preclassified items being assigned a manually determined one of the classifications; and
      logic that periodically rebuilds the data dictionary based at least in part on data associated with automatically classified items having manually confirmed classifications.

3. The system of claim 2, wherein the identified classification is identified based at least in part on a plurality of preclassified tokens, each one of the preclassified tokens being assigned a manually determined one of the classifications.

4. The system of claim 2, wherein the identified classification is identified based at least in part on at least one preclassified item that is similar to the item.

5. The system of claim 2, wherein the item classification application further comprises logic that adjusts the threshold based at least in part on whether the identified classification is correct.

6. The system of claim 2, wherein the item classification application further comprises logic that adjusts the data dictionary when the manual confirmation indicates that the identified classification is not correct.

7. The system of claim 2, wherein the item classification application further comprises:
   logic that assigns the identified classification to the item when the manual confirmation indicates that the identified classification is correct;
   logic that obtains a manually selected one of the classifications when the manual confirmation indicates that the identified classification is not correct; and
   logic that assigns the manually selected one of the classifications to the item when the manual confirmation indicates that the identified classification is not correct.

8. The system of claim 2, wherein the classifications comprise a hazardous item classification and a non-hazardous item classification.

9. The system of claim 8, wherein the item classification application further comprises logic that determines a shipping exception for the item when the identified classification is the hazardous item classification.

10. The system of claim 8, wherein the item classification application further comprises logic that identifies a hazard class for the item when the identified classification is the hazardous item classification.

11. The system of claim 2, wherein the data dictionary comprises a plurality of tokens, each of the tokens being associated with a probability for each one of the classifications.

12. The system of claim 11, wherein the logic that identifies further comprises:
   logic that generates a plurality of item tokens from the data associated with the item;
   logic that determines a probability for each of the classifications for each of the item tokens based at least in part on the probabilities associated with a corresponding one of the tokens of the data dictionary; and logic that determines the identified classification and the confidence score according to a naïve Bayes classifier using the probabilities determined for at least a subset of the item tokens.

13. The system of claim 11, wherein each of the tokens has a corresponding count for each one of the classifications, and the logic that builds further comprises logic that increments each count according to occurrences of the corresponding token in the preclassified items that are assigned the corresponding one of the classifications.

14. The system of claim 11, wherein the item classification application further comprises logic that updates the data dictionary based at least in part on the data associated with the item when the manual confirmation indicates that the identified classification is correct.

15. A method, comprising:
- identifying, in at least one computing device, one of a plurality of classifications based at least in part on a plurality of tokens associated with an item and a data dictionary, thereby producing an identified classification that is associated with a confidence score;
- automatically assigning, in the at least one computing device, the identified classification to the item when the confidence score meets a threshold; and
- obtaining, in the at least one computing device, a manual confirmation of the identified classification when the confidence score is below the threshold, the manual confirmation indicating whether the identified classification is erroneous;
- building, in the at least one computing device, the data dictionary based at least in part on data describing a plurality of preclassified items, each one of the preclassified items being assigned a manually determined one of the classifications; and
- periodically rebuilding, in the at least one computing device, the data dictionary based at least in part on data associated with automatically classified items having manually confirmed classifications.

16. The method of claim 15, wherein identifying, in the at least one computing device, the one of the classifications further comprises identifying the one of the classifications using a naïve Bayes classifier.

17. The method of claim 15, further comprising adjusting, in the at least one computing device, the data dictionary based at least in part on a corrected classification when the manual confirmation indicates that the identified classification is erroneous.

18. The method of claim 15, wherein the tokens associated with the item are generated from at least a targeted portion of data describing the item.

19. The method of claim 18, wherein at least one of the tokens associated with the item comprises a plurality of words.

20. The method of claim 15, further comprising:
- assigning, in the at least one computing device, the identified classification to the item when the manual confirmation indicates that the identified classification is not erroneous;
- obtaining, in the at least one computing device, a manually selected one of the classifications when the manual confirmation indicates that the identified classification is erroneous; and
- assigning, in the at least one computing device, the manually selected one of the classifications to the item when the manual confirmation indicates that the identified classification is erroneous.

* * * * *